Figure 1:
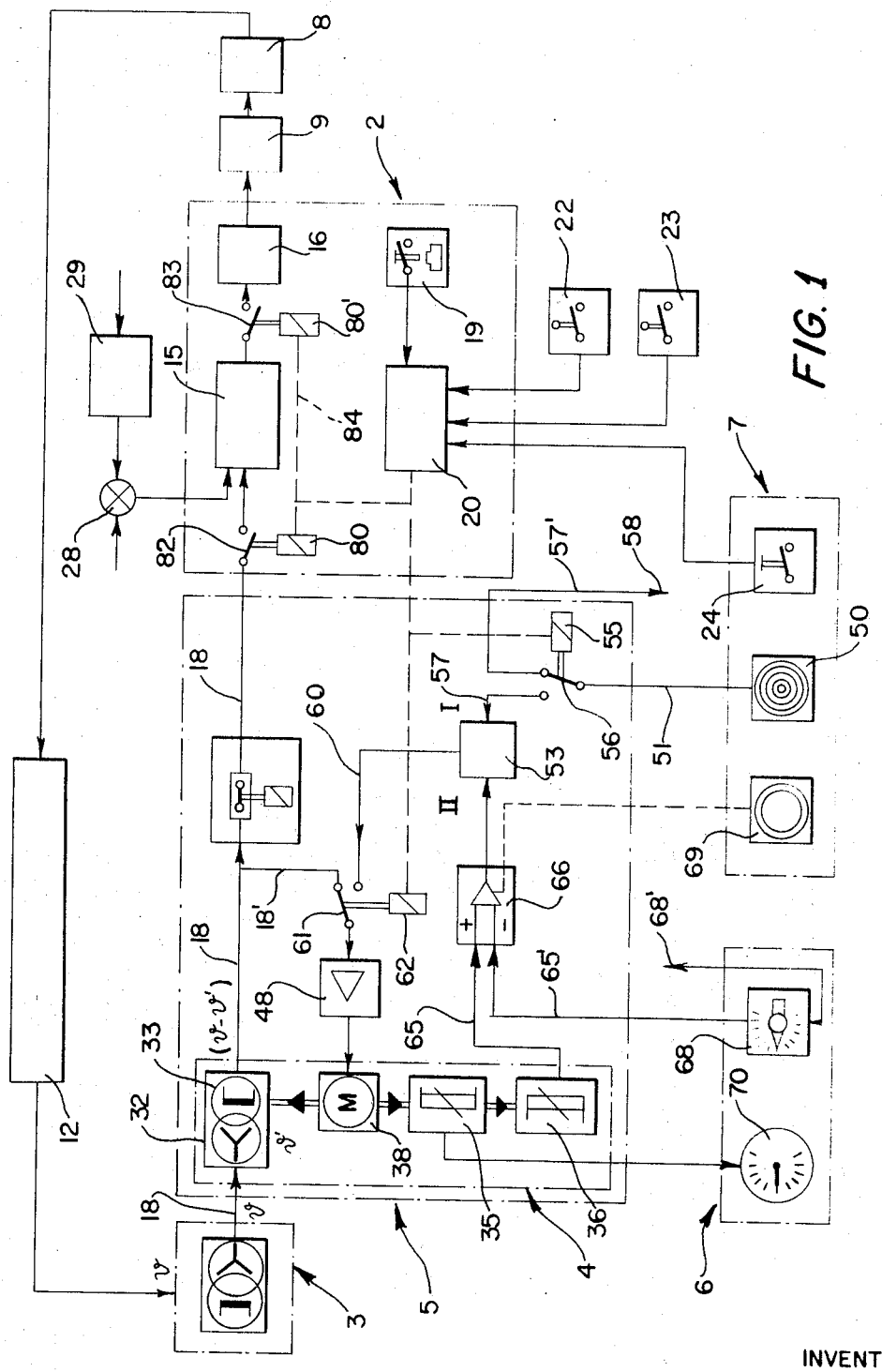

United States Patent [19]
Draganow et al.

[11] 3,774,099
[45] Nov. 20, 1973

[54] VTOL ATTITUDE CONTROL DEVICE FOR AIRCRAFT

[75] Inventors: Radoslav Draganow, Wessling;
Rudolf Reitemeier, Überlingen,
both of Germany

[73] Assignee: Dornier A.G., Friedrichshafen/
Bodensee, Germany

[22] Filed: Aug. 9, 1971

[21] Appl. No.: 170,019

[30] Foreign Application Priority Data
Aug. 18, 1970 Germany.................. P 20 40 857.5

[52] U.S. Cl.................. 318/584, 318/591, 318/648, 244/77
[51] Int. Cl.......................... G05d 1/00, B64c 13/18
[58] Field of Search.................... 318/591, 580, 584, 318/648, 649; 244/77

[56] References Cited
UNITED STATES PATENTS

| | | | |
|---|---|---|---|
| 3,521,838 | 7/1970 | Buffum et al.................. | 318/584 X |
| 3,617,848 | 11/1971 | Friday et al..................... | 318/591 X |
| 3,638,092 | 1/1972 | Kammerer.......................... | 318/584 |
| 3,471,108 | 10/1969 | Corso................................. | 318/649 |

*Primary Examiner*—T. E. Lynch
*Attorney*—James E. Bryan

[57] ABSTRACT

This invention relates to a control device for aircraft, particularly those having vertical and horizontal and/or hovering flight properties, with a position regulation being operative only during the vertical and/or the transitional flight phases, which comprises
a VTOL attitude regulator,
a position platform,
preselecting means for the preselection and storage of theoretical pitching position values,
comparator means connected to said preselecting means, cooperating with said preselecting means, and being installed in the automatic control system between the position platform and the VTOL attitude regulator, and
an arbitrarily actuatable release means which applies the preselected stored theoretical values to the comparator means.

15 Claims, 2 Drawing Figures

INVENTORS
RADOSLAV DRAGANOW
RUDOLF REITEMEIER

*James E. Bryan*
ATTORNEY

VTOL ATTITUDE CONTROL DEVICE FOR AIRCRAFT

The present invention relates to control devices for aircraft, particularly aircraft having vertical flight properties, horizontal flight properties, and hovering flight properties, with a position control which becomes operative only during the vertical flight phase and/or the transitional flight phase, and which contains VTOL position regulator and a position platform.

When starting and/or landing transitions are carried out, or also during hovering flight, it is necessary that a predetermined longitudinal inclination or pitch be set and maintained. The pilot must see to it that the angle of pitch does not exceed a specific maximum value. During the starting transition it may be required in specific cases that the aircraft be given a specific longitudinal inclination immediately after lift-off. In order to make it possible that the landing transition be executed in an optimum manner, it also may be necessary to alter the longitudinal inclination once or several times within this flying phase.

Since, however, the pilot is extremely busy during the transition, for example with setting the thrust values, thrust lines and the like, the setting and the control of the longitudinal inclination and preservation of the angle of pitch represents a considerable additional burden for the pilot.

The present invention eliminates the existing difficulties and provides a device with the aid of which it is possible to largely relieve the pilot, during the transitional phase, with respect to the control and setting of the longitudinal inclination or pitch.

In accordance with the present invention, present in the aircraft are a device for preselecting and storing theoretical values of pitching positions, a comparator connected to the preselecting device which cooperates therewith, and which is installed in the automatic or feedback control system between the position platform and the VTOL position regulator, and an arbitrarily actuatable release mechanism which applies the preselected stored theoretical values to the comparator.

By means of a control device constructed in this manner the pilot is able to preselect the longitudinal inclination of the aircraft required for the transition and/or for the hovering flight before beginning the landing transition, for example, or with the aircraft standing on the ground prior to lift-off, and he is able to set it at any desired moment within the transition by means of a release mechanism which is simple to manipulate. As a result, the duties of the pilot are substantially lessened during the transitional phase, and a considerable increase in flying safety is thereby achieved.

In addition thereto, an essential feature of the present invention resides in that the comparator consists of a follow-up system which — when the VTOL position regulator is switched off — maintains the regulating signal constantly at the value "zero" by way of switching means and a first control path, independently of position changes of the aircraft.

This has the effect that, when the VTOL position regulator is disengaged or disconnected, the electric position trimming is automatically guided accordingly by means of the longitudinal inclination signal of the position platform via the follow-up or automatic control system so that no sudden position changes which might produce dangerous conditions can occur when the VTOL position regulator is engaged. The follow-up system works not only when the VTOL position regulator is engaged, but also during the autopilot operation. An adjustment by the pilot of the instantaneous longitudinal inclination to the preselected theoretical longitudinal inclination prior to connecting the VTOL position regulator is therefore not necessary.

A further feature of the present invention resides in that the preselecting device is adapted to be connected to the follow-up system by way of switching means and a second control path, and in that, starting from the zero value, a regulating signal is formed which corresponds to the preselected theoretical value and is proportional to the pitching position.

Another feature of the present invention further resides in that the follow-up system consists of a receiver synchro being connected to the position platform, and of a control motor which is adapted to be regulated from the output of the receiver synchro and influences or acts upon the secondary thereof.

This construction or provision has the effect that the follow-up system may be used in conjuction with the preselecting and releasing mechanisn on the one hand for setting and maintaining the theoretical position of longitudinal inclination and, at the same time, for purposes of the zero trimming prior to engaging the VTOL position regulator. This results in a significant simplification from the point of view of equipment techniques of the entire control device.

By virtue of the feature that follow-up members are provided for which are adjustable by means of the control motor, and indicating means connected to the former which render apparent the position of the follow-up system, and by virtue of the feature that the follow-up system is arbitrarily actuatable by way of a releasing mechanism with priority with regard to the preselecting device, the pilot can, if necessary, intervene at any time in the course of operation of the pitching position trimming without having to perform any switching operations.

For the purpose of releasing the follow-up control circuit and preparing the preselection control circuit it is proposed in accordance with yet another feature of the present invention that, for the effective switching of the control paths, the switching means operate in dependence upon the switching-on or engaging device of the VTOL position regulator. The automatic change-over or switching operation represents a considerable simplification both of the construction of the control device from the point of view of equipment techniques, and of the operation thereof.

In order to provide for the possibility of varying the longitudinal inclination, during the transition, with the aid of the preselecting and releasing device, it is further proposed according to yet another feature of the present invention, that the theoretical value setting means consist of voltage dividers which may be dialed via the preselecting device. The pilot is accordingly able — after respectively setting one preselected longitudinal inclination — to preselect another longitudinal inclination and to release it at the desired moment in time. Hence, the pilot is relieved from the duty of precisely setting the individual longitudinal inclinations.

In this connection it is also conceivable that the setting of varying longitudinal inclinations is brought about in a programmed sequence by way of the preselecting and releasing device.

Figure 2:
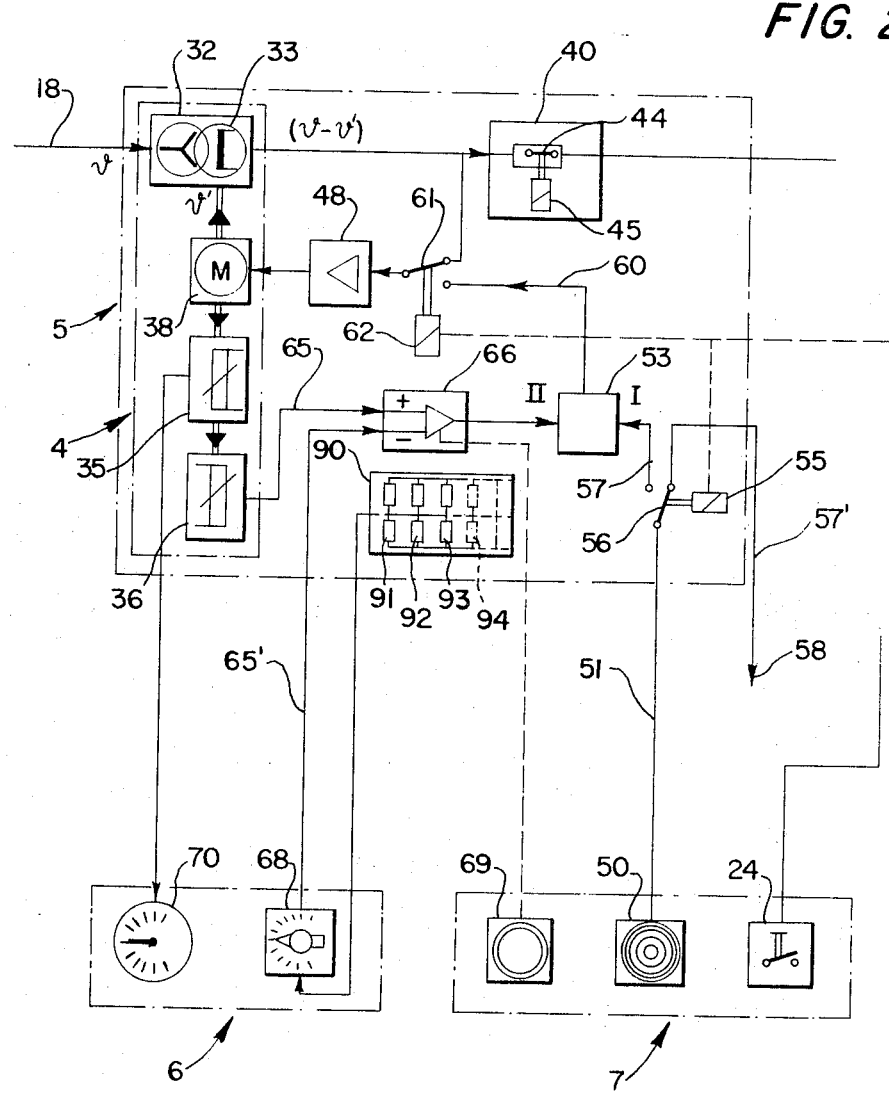

Two embodiments of the control device as proposed by the present invention are shown in the accompanying drawing, wherein FIG. 1 illustrates the control device in the form of a block diagram, and FIG. 2 illustrates a furhter embodiment of the control device in a section from the block diagram of FIG. 1.

As is apparent from the block diagram according to FIG. 1, reference numeral 2 identifies the flight attitude regulator; reference numeral 3 represents a position platform, and reference numeral 4 is used to designate a follow-up system. The flight attitude regulator 2 as shown in this case is operative only during the vertical flight phase, the hovering flight phase, and/or the transitional flight phase. The pitching position trimming means 5 containing the follow-up system 4 is herein intended to be operative only in conjunction with the VTOL flight attitude regulator 2. Furthermore, reference numeral 6 designates the instrument panel, and reference numberal 7 represents the control stick of the aircraft. Positioned behind the flight attitude regulator 2 are the control rods 9 extending to the control members 8. The aircraft representing here the controlled system has been identified with reference numeral 12.

The regulator 2 contains specifically an amplifier and an electronic part 15 which acts on the control rods 9 by way of a control motor 16, and therewith upon the control members 8. The regulator 2 cooperates with the position platform 3 in a known manner and, in the switched-on or engaged position, receives from the latter via the feed or supply line 18 the position signal $\gamma-\gamma'$ which is required for the regulation of the aircraft 12. The regulator 2 further contains a coupling 19 as well as an automatic throw-in-gear mechanism 20, and connected to the latter are landing gear switches 22, fuel throttles 23, and a coupling switch 24 at the control stick 7 For purposes of the general stabilization, the regulator 2 receives the regulating signal by way of a comparator 28 which unites or combines the signals emanating from a theoretical value setting means (the control stick) and from a measuring or sensing element, for example in dependence upon the vertical velocity of the aircraft 12.

As already has been referred to hereinabove, the pitching attitude trimming device 5 with its follow-up system 4 is inserted or installed into the feed or supply line 18 — which is formed by a three-phase system — between the position platform 3 and the regulator 2. The follow-up system 4 consists in this case of a receiver synchro 32 and a control or servo motor 38 influencing the secondary 33 of the receiver synchro 32 as well as simultaneously therewith and parallel thereto two potentiometer taps 35 and/or 36 in the sense of or toward a twisting or rotation thereof.

Between the receiver synchro 32 and the VTOL attitude regulator 2, a line portion 18' branches off the line 18 and is applied via an amplifier 48 to the control motor 38. Arranged at the control stick 7 is a trimming switch 50 which connects by way of a line 51 to a locking mechanism 53. The trimming switch 50 is adapted to be connected selectively, by means of the line portions 57 and/or 57', either to the mechanical trimming means 58 or to the locking mechanism 53 via a line 51 and a switch 56 which latter is actuatable by a relay 55. A connecting line 60 extends from the locking mechanism 53 to a contact of a switch 61 which is actuatable by means of a relay 62. With the aid of the switch 61 either the line portion 18' or the line portion 60 are applied to the control motor 38 by way of the amplifier 48.

Furthermore, a connection exists, by way of a line 65, between the potentiometer 36 and the locking mechanism 53 with the interposition of a comparator 66 and, respectively, by way of a line 65' between a preslecting switch 68 at the instrument panel 6 and the comparator 66. As has been indicated in phantom, a further connection exists between the comparaotor 66 and a releasing switch 69 at the control stick 7. The preselecting switch 68 is inserted or installed into a circuit with a current source 68', and the applied voltage is adjustable. The potentiometer 35 serves for the transmission of the longitudinal inclination signal and is connected to a pitching trimmer indication or indicating means 70. The two inputs at the locking mechanism 53 have beeh identified with reference symbols I and/or II.

As has also been shown in phantom in the block diagram, the automatic throw-in-gear mechanism 20 is in operative connection both with the relay 62 of the switch 61 and with the relay 55 of the switch 56. Furthermore, there are installed or inserted into the line 18 further switches 82 and/or 83 which may be actuated by means of the respectively coordinated relays 80 and/or 80' via the line 84 shown in phantom by the automatic throw-in-gear mechanism 20.

The operation of the construction proposed by the present invention as described hereinabove will be indicated hereinbelow.

In the drawing, the relays and, respectively, the switches of the device have been shown for the disengaged or uncoupled condition of the regulator 2. It has been presupposed therein that the pitching position trimmer or trimming means 5 as described operates only in conjunction with the regulator 2.

In contrast to the mechanical trimming means, the electrically-operating trimming device 5 does not serve for trimming out constant disturbing moments but for setting the desired pitching position angles. There are present — as has already been set forth hereinabove — two mutually separate control paths, and the first one of these is effectively switched with the VTOL attitude regulator 2 being disengaged or disconnected, while the second one is effectively switched when the VTOL attitude regulator 2 is engaged.

Within the first control path, the position or attitude signal $\gamma$ of the three-gyro platform 3 corresponding to the respective pitching position of the aircraft is automatically maintained at the value "zero" via the follow-up system 4 at the output of the pitching position trimming means. Within the second control path, which becomes effective — instead of the first switching path — with the engagement of the VTOL attitude regulator 2, the automatic operation of the follow-up is interrupted and there is formed at the output of the pitching position trimming instrument or means 5 a signal which corresponds to the theoretical value of the pitching position and which represents the regulating signal for the now connected or thrown-in VTOL attitude regulator 2.

The second switching path allows on the one hand for a trimming which is carried out by the pilot with the aid of the actuation of the trimming switch 50 and control of the indication 70 of the longitudinal inclination angle γ, or an automatic trimming during which the theoretical value of the longitudinal inclination γ is set at the preselecting switch 68 and the trimming takes place automatically by virtue of the actuation of the releasing key 69.

In order to render it possible that, within the first switching path, the regulating signal for the VTOL attitude regulator 2 be maintained at the value "zero," independently of the respective longitudinal inclination of the aircraft, the switches 61, 82 and 56 are in the position shown in the drawing when the VTOL attitude regulator 2 is in the disengaged condition thereof. The signal γ furnished by the position platform 3 is applied — by way of the receiver synchro 32, the line portions 18 and 18' as well as the amplifier 48 — to the control motor 38 which will readjust the secondary 33 of the receiver synchro 32 until the output signal of the receiver synchro 32 displays the value "zero." Simultaneously therewith, the potentiometer 35 and therewith the longitudinal inclination indication or indicating means 70, as well as the potentiometer 36 are readjusted by way of the control motor 38. At the indicating instrument 70 there will thus appear at all times the instantaneous value of the actual longitudinal inclination of the aircraft. A change of the longitudinal inclination of the aircraft brings about automatically the starting of the control motor 38, and therewith the displacement of the secondary 33 of the receiver synchro 32 until the output signal shows once again the value "zero."

When the VTOL attitude regulator 2 is coupled in, or engaged, the first switching path, and therewith the automatic readjustment of the secondary 33 of the receiver synchro 32, is interrupted via the automatic throw-in-gear mechanism 20, and the second switching path will be effectively connected by means of the actuation of the switches 61, 56 and 80.

When thereupon the trimming switch 50 is actuated by the pilot for the purpose of the manual trimming, the control motor 38 of the follow-up system 4 receives — via the line portions 51 and 60 — a displacing signal, and specifically as long as the trimming switch 50 is actuated. The control motor 38 displaces the secondary 33 of the receiver synchro 32 by a certain amount so that at the output of the pitching position or attitude trimming instrument 5 a regulating signal γ—γ' is formed which corresponds to the theoretical value of the longitudinal inclination. The control 38 runs in the ordered position, for example at a trimming velocity of 3°/sec; the pilot can check the attainment of the theoretical longitudinal inclination at the indicating instrument 70 and interrupt the trimming, when the theoretical value has been reached, by way of the trimming switch 50 at the control stick 7.

This has the effect at the moment when the VTOL attitude regulator 2 is engaged, and therewith at the time of the change-over from the first to the second control path, starting from the zero value which is continuously maintained up to the change-over at the output of the pitching position trimming instrument 5 no abrupt change in the longitudinal inclination can take place.

After the engagement of the VTOL attitude regulator 2, the pilot has at his disposal a second possiblity for the trimming, as has already been set forth hereinabove. The trimming operation proceeds in this case automatically by way of the preselecting means 68 and the releasing means 69.

Within the first switching path, preserving of the zero value at the output of the pitching position trimming instrument 5 takes place in the manner already described herein. On the other hand, in contrast to this procedure, the pilot may preselect a theoretical value of the longitudinal inclination at the preselecting switch 68, and specifically already prior to throwing in or engaging the VTOL attitude regulator 2. A differential signal is thereby formed by means of the comparator 66 from the predetermined theoretical value signal via the line portion 65' and from or on the basis of the actual value signal furnished by means of the control motor 38 and the potentiometer 36 which is influenced thereby. Provided the VTOL attitude regulator 2 is coupled in, this differential signal will guide the control motor 38, by way of the releasing key 69 resting against the comparator 66, the locking mechanism 53 and the line portion 60, until the difference of the two comparator inputs 65 and/or 65' is equal to "zero." The release thus may be effected arbitrarily by the pilot. Because of the operation of the control motor 38, the latter displaces the secondary winding 33 of the receiver synchro 32 until such time as the theoretical value signal of the longitudinal inclination will have been set at the output of the receiver synchro 32. By way of the amplifier and electronic part or element 15 and the control motor 16, a corresponding displacement of the control members 8 of the aircraft is brought about, and the preselected longitudinal inclination is accordingly set.

By way of the locking mechanism 53, the pilot is able to intervene — if need be — in the automatic operation or course of the trimming. The locking mechanism 53 concedes priority to the signal emanating from the trimmer switch 50 by way of the input I before the input II resting against the compartor 66. Thus the pilot is able to intervene in each phase of the automatic trimming operation via the trimmer switch 50 at the control stick 7 and to continue the trimming manually.

In the embodiment according to FIG. 2, a system 90 of voltage divieiers 91, 92, 93 and 94 is provided for which — together with the potentiometer 35 — represents a bridge circuit. The system 90 in conjunction with the pitching position trimming instrument 5 has the role of providing for the possibility of preselecting several different longitudinal inclinations.

For this purpose, theoretical values for the longitudinal inclination are adapted to be definitely preset at the voltage dividers 91 to 94. The voltage dividers are connected to the comparator 66 by way of the preselecting switch 68 by means of a line portion 65'. At the same time there exists a connection between the potentiometer 36 and the comparator 66 via a line portion 65. Furthermore, the releasing switch 69 is positioned at the comparator 66, as has already been described in connection with the embodiment shown in FIG. 1.

The operation of this embodiment is as follows:

One of the programmed theoretical values of the longitudinal inclination is set by means of the preselecting switch 68, and the corresponding voltage value is switched from one of the voltage dividers 91 to 94 to the input of the comparator 66. The comparator 66 is initially blocked; accordingly its output is "zero." When the pilot then actuates the releasing key 69 at the control stick 7, the comparator 66 unlocks and will steer or guide the control motor 38 of the pitching position trimming instrument, via the locking mechanism 53 and the amplifier 48, until the difference of the two comparator input will once more assume the value "zero." As a result, the comparator 66 falls off and the follow-up system 4 is brought to a standstill in the preselected position. Within or during the aforementioned operation, the VTOL attitude regulator 2 receives, via the follow-up system 4 which runs at a specific speed, a new ordered theoretical position value. The signal $\gamma-\gamma'$ is not equal to zero. The amplifier and electronic element 15 thereby displaces the control members 8 until the new theoretical position value has been attained. After this adjustment the pilot has the possibility of steering toward a new voltage value, i.e., a new theoretical value, by setting the preselecting switch 68, and of applying it to the comparator 66. At the desired moment the pilot can unlock the comparator via the releasing key 69. Therewith a second preselected longitudinal inclination angle will be set automatically in the manner already described hereinbefore. The same operating sequence will result for further presettings at the preselecting switch 68 and with the renewed actuation of the releasing key 69.

It will be obvious to those skilled in the art that many modifications may be made within the scope of the present invention without departing from the spirit thereof, and the invention includes all such modifications.

We claim:

1. A control device for aircraft, particularly those having vertical and horizontal and/or hovering flight properties, with a position regulation being operative only during the vertical and/or the transitional flight phases, which comprises
   a VTOL attitude regulator,
   a position platform,
   preselecting means for the preselection and storage of theoretical pitching position values,
   summation former means connected to said preselecting means, cooperating with said preselecting means in the formation of a signal serving for said regulation and taking place for adjustment of the longitudinal inclination of said aircraft, and being installed in the automatic control system between the position platform and the VTOL attitude regulator, and
   an arbitrarily actuatable release means which applies the preselected stored theoretical values to the summation former means.

2. A control device according to claim 1 in which the summation former means is a follow-up means which, with the VTOL attitude regulator being disengaged, maintains the regulating signal constantly at the value "zero" via switching means and a first control path, independently of position changes of the aircraft.

3. A control device according to claim 2 in which the preslecting means is adapted to be connected to the follow-up means by way of switching means and a second control path and, starting from a zero value, a regulating signal is formed which corresponds to the preselected theoretical value and is proportional to the pitching position.

4. A control device according to claim 2 in which the follow-up means comprises a receiver synchro connected to the position platform, and a control motor means adapted to be controlled from the output of the receiver synchro and which influences the secondary thereof.

5. A control device according to claim 4 in which the control motor means runs from one position into the other at a speed resulting in jolt-free trimming.

6. A control device according to claim 2 including a second summation former means which forms a differential value from the actual and theoretical values of the position platform and the preselecting means, and which is adapted to be connected to the follow-up means by means of a release mechanism.

7. A control device according to claim 6 in which, for the purpose of setting the actual value of the position platform, a signal setting means is mounted at the second summation former means, said signal setting means being acted upon by control motor means analogous to the displacement of the secondary of a receiver synchro.

8. A control device according to claim 7 including follower members which are adjustable by said control motor means, and also including indicating means connected to said follower members and rendering apparent the position of said follow-up means.

9. A control device according to claim 6 including an adjustable theoretical value setting means adapted to be connected to said second summation former means by a preselecting switch.

10. A control device according to claim 9 in which the theoretical value setting means comprises voltage dividers which may be dialed by way of the preselecting means.

11. A control device according to claim 9 in which the theoretical value setting means is infinitely variable by way of the preselecting means.

12. A control device according to claim 2 in which the follow-up means is arbitrarily actuatable via a releasing means with priority as compared to the preselecting means.

13. A control device according to claim 12 including between the preselecting means and, respectivley, the releasing means and the follow-up means, a locking means conceding to the input of the releasing means priority over the input of the preselecting means.

14. A control device according to claim 12 in which the releasing means and preselecting switch are mounted at the control stick of the aircraft.

15. A control device according to claim 1 including switching means, for switching of control paths, which operate in dependence upon the switching-on mechanism of the VTOL attitude regulator.

* * * * *